R. T. SMITH.

Apparatus for Transmitting Motive-Power.

No. 6,400. Reissued April 27, 1875.

Witnesses.
James Martinez
J. N. Campbell

Inventor:
R. T. Smith
by Munn, Fennick & Lawrence
Attorneys

UNITED STATES PATENT OFFICE.

ROSWELL T. SMITH, OF NASHUA, NEW HAMPSHIRE, ASSIGNOR TO HIMSELF, JOHN G. BLUNT, WILLIAM EARL, AND J. K. PRIEST.

IMPROVEMENT IN APPARATUS FOR TRANSMITTING MOTIVE POWER.

Specification forming part of Letters Patent No. 59,089, dated October 23, 1866; reissue No. 4,623, dated November 7, 1871; reissue No. 6,400, dated April 27, 1875; application filed January 15, 1873.

*To all whom it may concern:*

Be it known that I, ROSWELL T. SMITH, of Nashua, in the county of Hillsborough and State of New Hampshire, have invented a new and useful Improvement in Transmitting Motive Power; and I do hereby declare that the following is a full, clear, and exact description thereof, reference being had to the accompanying drawings, making part of this specification, in which—

Figure 1:
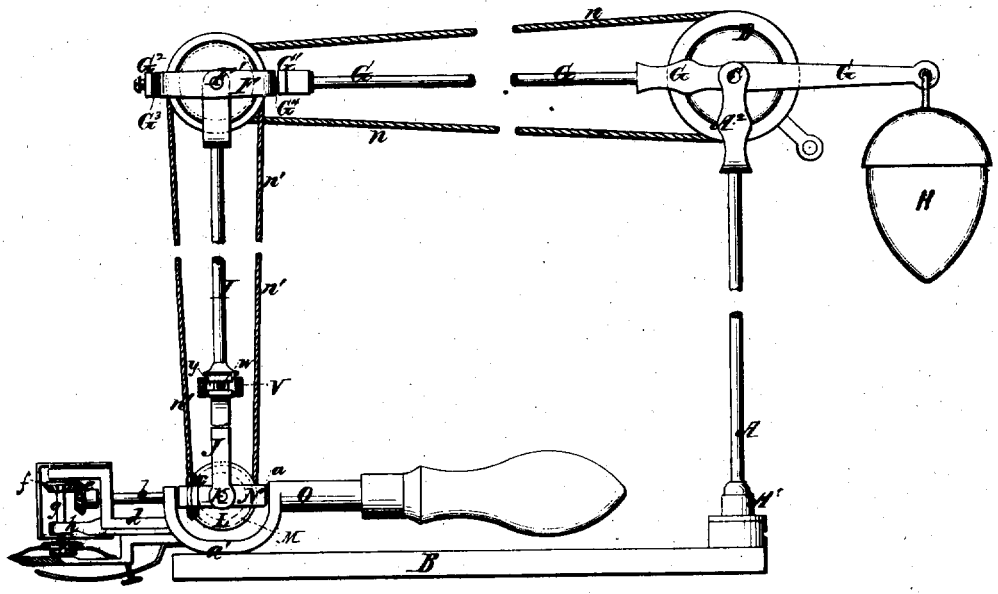
Figure 2:
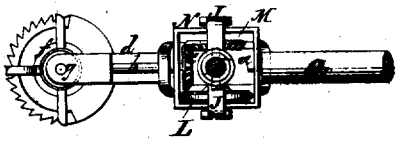
Figure 3:
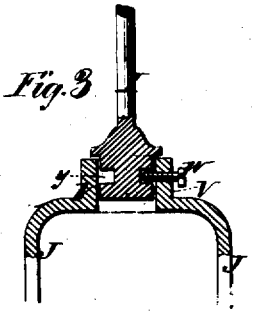
Figure 4:
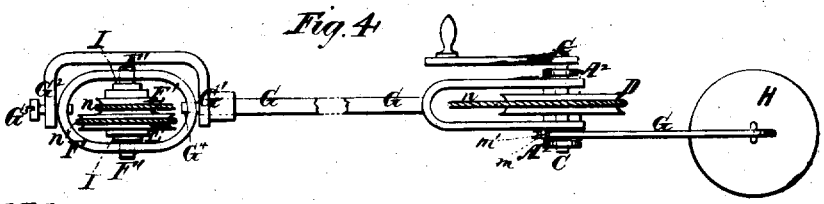

Figure 1 is an elevation of one side of the machine, partly in section. Fig. 2 is a top view of part of the machine. Fig. 3 is a detail section of the swivel-connection of the pendent rod. Fig. 4 is a top view, and Fig. 5 a side and sectional view, of parts of the machine.

In these views the balancing-arm is made in two parts instead of in one, as shown in Fig. 1, and the parts are united forward of the pivot-shaft by a coupling device.

My invention is designed to afford a more convenient means than has heretofore been provided for transmitting motion from a suitable prime mover to a shearing-instrument, brush, or other instrument which is held in the hand, and requires a great freedom of movement in order to permit its manipulation in various directions.

Figure 5:
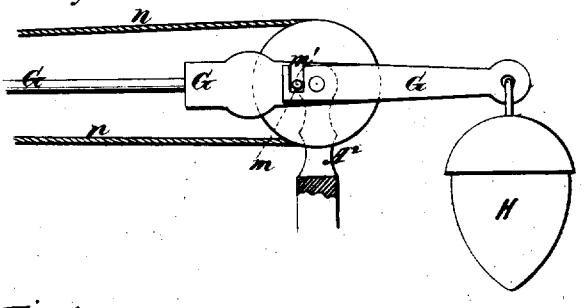

In the accompanying drawings, A represents a standard or support for the whole mechanism. This support is made to swivel or turn horizontally in a socket or foot-piece, $A^1$; or, if desired, the standard itself may be made of two parts, and these parts be connected by a swivel-joint. The standard may be attached to a bed-piece, B, in order to keep it steady and in an upright position. The upper end of the standard may be forked, so as to afford two separate bearings, $A^2$, for a pivot-shaft, C, which passes horizontally through them and supports a pulley, D. G is a balancing-arm placed between the bearings and hung upon the pivot-shaft C, so as to swing freely in a vertical plane. This arm G may be of one piece, as shown in Fig. 1, or of two pieces coupled together forward of the shaft C, by a pin, *m*, on one and a slot, *m'*, in the other part, as shown in Figs. 4 and 5. That portion of the arm G proper which extends backward from the pivot-shaft C is shorter than that portion which extends forward therefrom. On the short portion a weight, H, is applied, which is the equivalent of the extra length given to the front end of the arm and the load carried on said portion of the arm. The front extremity of the arm G has a bow-shaped piece fastened on it at $G^1$; said bow-shaped piece extending from $G^1$ to $G^2$, and forming at $G^2$ a support for a pivot-pin, $G^3$. The arm G is also made to afford a pivot-bearing at $G^4$, by extending it through and a little beyond the end $G^1$ of the bow-piece. F is an open hanger of oblong form placed upon the pivot-bearings $G^3$ $G^4$ of the bow-piece G. This hanger turns freely on its pivots. Through the hanger F a horizontal pivot-shaft, F', is passed parallel with the pivot-shaft C, and on this shaft, within the hanger, a double-grooved pulley, E E', is supported. The diameter of one periphery of this pulley is greater than that of the other. Between the inner sides of the hanger F and the pulley a pendent rod or sustaining device, I, is hung by its upper forked end upon the pivot-shaft F', so as to swing back and forth in a vertical plane on said shaft, or along with the arm G in a similar plane on the pivot-shaft C. The hanger F, being pivoted at $G^3$ and $G^4$, permits the pendent rod or sustaining device I to swing in a lateral plane, which is transverse to the vertical plane in which the arm G swings. On the lower end of the pendent rod or bar I a stirrup, J, is hung by means of a swivel-joint connection, V, which is held together by means of the shoulders of a groove, Y, in and around the rod or sustaining device I, and a confining-screw, W, passed through a socket of the stirrup J into the groove, as shown in Fig. 3. The stirrup J is forked at its lower end, and affords two separated supports for a pivot-shaft, K, which is passed through them. O is a hinged section for supporting a shearing implement, or a brush or other instrument, on one of its ends, and a handle on its other end, as illustrated in the drawings. This section may be formed with an intermediate bowed portion, as at *a'*, so as to afford two supports—one for a fixed pivot, *a*, and the other for a revolving shaft, *b*; and forward of, and extending out from, one end of this bowed portion, as a part of it, may be brackets *d h*, which afford supports or bearings for a vertical shaft, *g*, and a means of attachment for a comb-plate of a shearing-instrument.

On the shaft K, and the pivots *a* and *b*, the bearing N is hung so as to be able to swing with the section O, and the shearing-instrument attached thereto in a vertical plane on the shaft K, and to allow the section O and the said instrument carried by it to swing in a vertical plane on said pivots, which is at right angles to the plane in which the bearing N and section O swing on the shaft K. On the shaft K, within the bearing N, is a pulley, L, and a bevel-wheel, M, and on the shaft *b* and *g* are bevel-wheels *c*, *e*, and *f*. All these wheels are made fast upon their shafts. For transmitting the motion from the pulley D, a belt, *n*, is passed around this pulley and carried therefrom and to and around the smaller periphery E′ of the pulley E, and another belt, *n*′, is passed around the larger periphery E of said pulley, and therefrom to and around the pulley L. In the drawing a toothed comb-plate is shown, and above this plate a revolving cutter is shown attached to the lower end of the shaft *g*. This is merely for illustrating one useful application of the described mechanical movement. Instead of such shearing-cutter, and the adjuncts thereto, a brush or other device, to which motion is to be imparted in a variety of positions, may be operated by this movement with great convenience. The handle, or that portion of the section O which is grasped by the hand, might be attached directly to the bracket *d* of the bowed portion *a*′, instead of being attached to the rear forward extension of said bowed portion. Pulleys might be substituted for the bevel-wheels M and *f*, and the bevel-wheels *e* and *c* and their shaft dispensed with, in which case a belt would be passed from the pulley on the shaft *g* to the pulley on the shaft K. In fact, any other suitable means instead of those shown in the drawings, for transmitting the motion from the shaft K to the shaft *g*, might be used. By means of my invention the section O, and the instrument attached to it, can be moved in various directions, and still be kept in gear. It can be turned up and down in arcs of a circle on the pivots *a* and *b*, and horizontally on the swivel-joint V within a short range, when these movements are obtained without bringing into play the other joints. To obtain said movements in a longer range, the pendent rod I is swung back and forth on the shaft F′, or laterally on the pivots $G^3$ $G^4$; and to obtain these movements in a still greater range, the arm G is swung up and down on the shaft C, or around in any part of a circle. Any one of the joints, or all of them together, can be brought into play, as desired, and the movements can be made without in any manner interrupting the connection of the transmitting-gearing with the motive power or pulley D. Thus a mechanical movement is provided which can be used with great advantage for giving motion to a brush in "currying," or to a cutter of a shearing or clipping machine, or to other instruments requiring to remain in action or gearing connection while they are manipulated in various positions.

Among many of the important features of the invention herein described I will mention the following: First, the arm G, with its balancing-weight H, is the most useful. This arm supports all the weight forward of its axis of motion. If the implement is swung back and forth in a plane with the arm depressed, elevated, or moved in a lateral plane to the right or left, or adjusted to any position, the weight forward of the axis of the arm G is sustained in a uniform manner. The power of the weight never varies. The gearing never varies in its tension in any manner other than naturally results from wear, strain, and influences of the weather. Second, the provision made for swinging the machine around horizontally while it is capable of being swung up and down. Third, the compound joint between the balancing-arm and the pendent rod or bar, by which the said rod can be swung in both a lateral and a longitudinal plane independent of any movement of the balancing-arm upon its standard. Fourth, the pendent rod, having a swivel-joint, and connected to the section O by a compound joint, by means of which it can be swung around its own axis, while the section O can be moved in a lateral plane on its longitudinal axis, or in a vertical plane on its transverse axis. Fifth, the provision made for driving the instrument attached to section O with a positive motion from a prime mover, which has its power transmitted through parts which are constantly having their position changed.

I claim—

1. In the machine for transmitting motion, the hanger F, pivoted upon the arm G, which is pivoted to its support A, whereby the hanger itself is permitted to vibrate in a vertical plane, and the arm and hanger together are permitted to vibrate in a vertical plane, which is at right angles to the plane in which the hanger alone vibrates, substantially as described.

2. In the machine for transmitting motion, the bearing N, pivoted upon the stirrup of the rod I, and upon the section O, whereby said bearing is permitted to move in planes at right angles to one another, substantially as described.

3. In the machine for transmitting motion, the arm G, pivoted to a swiveling support, A, substantially as described.

4. In a machine for transmitting motion, the rod or bar I, pivoted to hanger of rod G, substantially as described.

5. In a machine for transmitting motion, the section O, pivoted to bearing N, substantially as described.

6. In a machine for transmitting motion, the combination of the swiveled rod or bar I with the section O, pivoted to bearing N, and having freedom to move in planes at right angles to each other, substantially as described.

7. In a machine for transmitting motion, the combination of the arm G, having freedom to vibrate vertically, the bar or rod I, having freedom to swing in planes at right angles to each other, and the section O, pivoted to bearing N, and having freedom to vibrate in planes at right angles to each other, substantially as described.

8. In the machine for transmitting motion, the combination of arm G, swiveled support A, bar or rod I, having freedom to swing in planes at right angles to each other, and the section O, pivoted to bearing N, substantially as described.

9. In a machine for transmitting motion, the arm G, or rod or bar I, swivel-joint V, and the section O, pivoted to bearing N, substantially as described.

10. In a machine for transmitting motion, the shaft *g*, driven with a positive motion from the prime motor, which has its power transmitted to said shaft through the gearing which is supported on shafts which form the joints of the parts composing the machine, substantially as herein set forth.

11. In a machine for transmitting motion, the combination of the following elements, viz: a vertically-swinging arm, G, a balancing-weight, H, and a support for said arm, substantially as described.

12. In a machine for transmitting motion, the combination of the following elements, viz: a vertically-swinging arm, G, a balancing-weight, H, a support for said arm, and a swivel-joint, $A^1$, substantially as described.

13. In a machine for transmitting motion, the combination of the following elements, viz: an arm, G, pivoted to swing vertically, a balancing-weight, H, a support for said arm, a hanger, F, a pivot-shaft, F′, and a pendent swinging rod or bar, I, substantially as described.

14. In a machine for transmitting motion, the combination of the following elements, viz: an arm, G, pivoted to swing vertically, a balancing-weight, H, a swinging pendent rod or bar, I, stirrup J, and joint V, substantially as described.

15. In a power-transmitting machine, the combination of the following elements, viz: the gear-shaft *g* on section O, and carrying a gear, *f*, and a pivot-shaft, K, on bearing N, and carrying a gear, M, and intermediate gearing, substantially as described.

16. In a machine for transmitting motion, the section O, carrying the instrument to be driven, and the handle pivoted to a vibrating bearing, N, on a pivot-shaft, K, substantially as described.

17. In a machine for transmitting motion, the combination of the following elements, viz: Swivel-stirrup J on rod I, bearing N, section O, carrying a handle, and the shafts K and *g*, connected by bevel-gears M and *c*, and *e* and *f* and *b*, substantially as described.

18. In a power-transmitting machine, the combination of the following elements, viz: a vertically-swinging arm, G, a balancing-weight, H, a pendent swinging bar or rod, I, and a hinged section, O, carrying the instrument to be driven, and pivot-shafts which support the gear-wheels and said arm, bar, and section, substantially as described.

19. In a power transmitting machine, the combination of the following elements, viz: belt-pulley D on pivot-shaft C, belt-pulleys E and E′ on pivot-shaft F′, belt-pulley L on pivot-shaft K, belts *n n′*, arm G, pivoted to swing vertically, a support for this arm, a balancing weight, H, a pendent rod or bar, I, having a stirrup at its lower end, substantially as described.

ROSWELL T. SMITH.

Witnesses:
J. E. MARSHALL,
JENNIE M. SMITH.